United States Patent
Corke et al.

(10) Patent No.: US 7,937,101 B2
(45) Date of Patent: May 3, 2011

(54) SYSTEM AND METHOD FOR PERFORMING COMMUNICATION IN A WIRELESS COMMUNICATION NETWORK

(75) Inventors: Robert J. Corke, Glen Ellyn, IL (US); Apoorv Chaudhri, Sunrise, FL (US); Trefor J. Delve, Lake Zurich, IL (US); Ralf Hekmann, Chicago, IL (US); Daniel G. Prysby, Sleepy Hollow, IL (US); Yadunandana N. Rao, Sunrise, FL (US); Christopher G. Ware, Heathcote (AU); Michael F. Zeleznik, LaGrange Park, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 901 days.

(21) Appl. No.: 11/844,624

(22) Filed: Aug. 24, 2007

(65) Prior Publication Data

US 2009/0054095 A1    Feb. 26, 2009

(51) Int. Cl.
| | |
|---|---|
| *H04B 7/02* | (2006.01) |
| *H04B 7/00* | (2006.01) |
| *H04B 7/216* | (2006.01) |
| *H04B 7/212* | (2006.01) |
| *H04L 1/02* | (2006.01) |
| *H04L 12/28* | (2006.01) |
| *H04L 12/56* | (2006.01) |
| *H04W 72/00* | (2009.01) |
| *H04W 4/00* | (2009.01) |
| *H04W 40/00* | (2009.01) |
| *H04J 1/00* | (2006.01) |

(52) U.S. Cl. ............... 455/516; 455/452.2; 455/422.1; 455/428; 455/464; 370/328; 370/329; 370/330; 370/331; 370/332; 370/338; 370/277; 370/401; 370/342; 370/343; 370/347; 375/267

(58) Field of Classification Search ............... 455/516, 455/452.2, 422.1, 428, 464; 370/328–332, 370/338, 277, 401, 342–343, 347; 375/267
See application file for complete search history.

(56) References Cited

U.S. PATENT DOCUMENTS

| | | | | |
|---|---|---|---|---|
| 6,907,023 | B2* | 6/2005 | McKenna et al. | 370/342 |
| 7,801,082 | B2* | 9/2010 | Jeon et al. | 370/331 |
| 2006/0205415 | A1* | 9/2006 | Rezaiifar et al. | 455/452.2 |
| 2007/0011110 | A1* | 1/2007 | Selvaraj et al. | 706/12 |
| 2007/0237254 | A1* | 10/2007 | Pi | 375/267 |
| 2007/0268862 | A1* | 11/2007 | Singh et al. | 370/329 |
| 2010/0202343 | A1* | 8/2010 | Hunzinger et al. | 370/315 |

FOREIGN PATENT DOCUMENTS

WO    2009029413 A1    3/2009

OTHER PUBLICATIONS

PCT International Search Report Application No. PCT/US2008/072937 dated Jan. 28, 2009—10 pages.
Kamakaris T et al.: A Case for Coordinated Dynamic Spectrum Access in Cellular Networks—dated Nov. 8-11, 2005—10 pages.

* cited by examiner

*Primary Examiner* — Matthew D Anderson
*Assistant Examiner* — Bobbak Safaipour (57) ABSTRACT

A wireless communication network is provided in which a plurality of radio devices achieve frequency diversity. By utilizing cognitive capability within the radio devices to iteratively select frequency sets, a lowest cardinality frequency set is generated and used to communicate amongst the plurality of radio devices. Each radio device can have different hardware, as the iterative selection of frequency set can take into account the different hardware capabilities of the radio devices.

20 Claims, 5 Drawing Sheets

SYSTEM AND METHOD FOR PERFORMING COMMUNICATION IN A WIRELESS COMMUNICATION NETWORK

FIELD OF INVENTION

The invention relates generally to wireless communication networks. More specifically, the invention relates to a method and system for performing communication in a wireless communication network.

BACKGROUND OF THE INVENTION

A conventional wireless communication network typically includes a plurality of radio devices communicating over a licensed spectrum within either a narrowband or broadband system. During operation within a narrowband licensed spectrum, radio devices communicate using a single narrow bandwidth channel. The use of single narrow bandwidth channel however, may result in a loss of packets during communication due to fading. In some broad band wireless communication systems, such as orthogonal frequency division multiplexing (OFDM), a set of usable frequencies is identified and used for communication amongst the radio devices. A disadvantage associated with using a set of frequencies however, is that if the coherence bandwidth of a channel exceeds that of transmitted or received information signal, then the frequency components experience correlated fading. Thus, both narrowband and broadband conventional systems operating within licensed spectrums face issues with fading. The problems with fading are further exacerbated in non-stationary conditions where channel coherence time is small. Selecting a single channel for transmitting an entire slot or data packet may result in poor performance, as the selected channel may exhibit fast fading.

In an attempt to address the issues of fading, many conventional systems rely on spatial or delay diversity schemes but these schemes are limited as to available gain. Due to the limited spectrum available to conventional licensed systems, frequency diversity has not been feasible.

Accordingly, it would be desirable to have a way to use multiple frequencies or channels for communication by radio devices within a communication system operating within a licensed spectrum.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the invention.

DETAILED DESCRIPTION OF THE INVENTION

Before describing in detail embodiments that are in accordance with the invention, it should be observed that the embodiments reside primarily in combinations of method steps and apparatus components related to a method and system for performing communication in a wireless communication network e.g. Public Safety Communication Network (PSCN). Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. A device or structure that is "configured" in a certain way is configured in at least that way, but may also be configured in ways that are not listed. The term "set" as used within this application can have any non-negative quantity of elements, ranging from none (the empty set or null set) to infinitely many. The number of elements in a set is called the cardinality, and can range from zero to denumerably infinite. The term frequency spectrum as used herein denotes a range of frequencies. The frequency band as used herein denotes a band of frequencies within the frequency spectrum.

Cognitive radio (radio) provides an application that can be added to any existing wireless communication network or architecture. The cognitive radio concept, which is generally intended to enable frequency sharing and reuse can be extended to increase performance of a radio. That is, rather than identifying a single available frequency band or channel for communication, multiple bands may be identified for the purpose of realizing frequency diversity gain. Typically, the cognitive radio includes a spectral sensing function and a cognitive engine. The spectral sensing function performs spectral analysis for the purpose of determining spectrum availability. The cognitive engine can use the spectrum availability information from the sensing function to identify available frequency bands. Briefly, in accordance with the present invention, radio capability is used to exploit the use of secondary frequency spectrum and build frequency diversity in communication systems previously limited by licensed frequency spectrums.

Various embodiments of the invention provide a method and system for performing communication amongst radio devices having cognitive capability in a wireless communication network. The method includes sensing a frequency spectrum by each radio device in the group of radio devices and identifying a set of usable frequencies for each radio device from the sensed frequency spectrum based on predetermined criteria. The predetermined criteria may include, but are not limited to one or more of metrics such as adequate Signal-to-Interference-Plus-Noise Ratio (SINR), power level detected over a bandwidth at the usable frequency being less than a predefined threshold, and tolerable multipath delay spread. The method further includes determining a common frequency set for the group of radio devices based on the sets of identified usable frequencies for the group of radio devices. From the common frequency set, each radio device selects an active frequency set based on its hardware capability. An active frequency set for a radio device includes the maximum number of frequencies usable by the radio device such that the frequency spacing between the frequencies in the active frequency set is maximized. The number of frequencies in an active frequency set of a radio device depends on the hardware capability or resources of the radio device, for example, number of RF front ends for the radio device. Thereafter, a lowest cardinality frequency set is selected for the group of radio devices from amongst an active frequency set selected for each radio device in the group of radio devices. The lowest cardinality frequency set is the active frequency set that includes the least number of frequencies.

Figure 1:
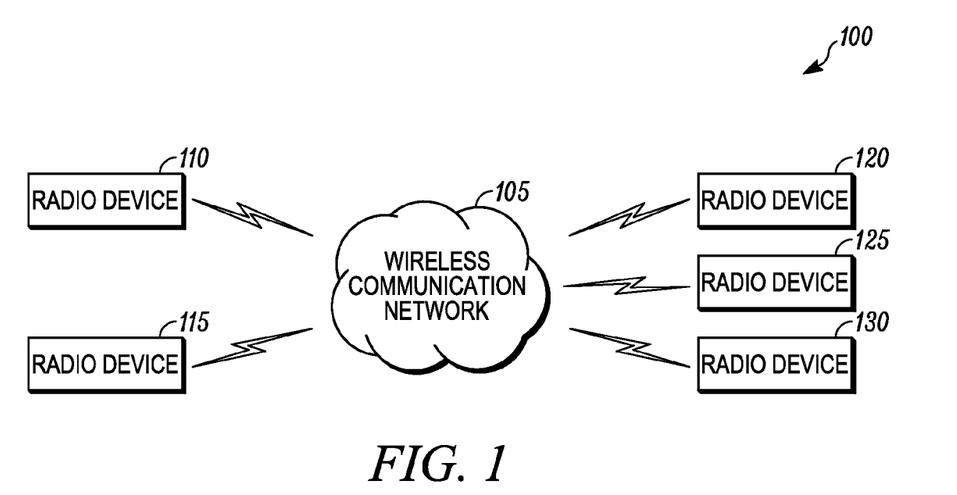
FIG. 1 is a block diagram showing a system for performing communication in a wireless communication network, in accordance with an embodiment of the invention.

FIG. 1 is a block diagram showing a system 100 for performing communication in a wireless communication network 105, in accordance with an embodiment of the invention. The wireless communication network 105 may be a Public Safety Communication Network (PSCN). Examples of the PSCN may include, but are not limited to a Hierarchically Structured Data (HSD) communication network, a High Performance Data (HPD) communication network, and Terrestrial Trunked Radio (TETRA) communication network.

The system 100 includes a group of radio devices (for example, a radio device 110, a radio device 115, a radio device 120, a radio device 125, and a radio device 130), which communicate with one another through the wireless communication network 105. Examples of a radio device may include but are not limited to, a mobile phone, a Personal Digital Assistant (PDA), a Laptop, and a Handheld Transceiver (Walkie-Talkie).

A radio device identifies a set of usable frequencies from one or more frequency spectrums. The radio device is further explained in detail in conjunction with FIG. 2.

Figure 2:
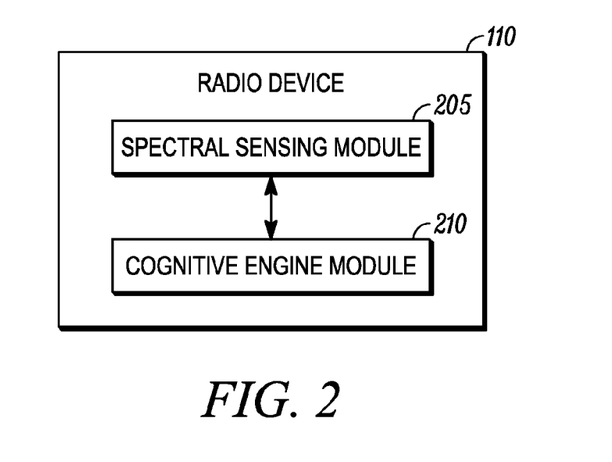
FIG. 2 is a block diagram showing various components a radio device, in accordance with an embodiment of the invention.

FIG. 2 is a block diagram showing various components of the radio device 110, in accordance with an embodiment of the invention. The radio device 110 includes a spectral sensing module 205 and a cognitive engine module 210 operatively coupled to the spectral sensing module 205. Though not shown, it will be apparent to a person skilled in the art that each of the radio device 115, the radio device 120, the radio device 125, and the radio device 130 include their own spectral sensing module and cognitive engine module.

The spectral sensing module 205 and the cognitive engine module 210 together identify a set of usable frequencies for each radio device based on predetermined criteria. The set of usable frequencies includes frequencies selected from a primary frequency spectrum and a secondary frequency spectrum. The predetermined criteria for selecting a usable frequency may include, but are not limited to power level detected over a bandwidth being less than a predefined threshold, adequate Signal-to-Interference-plus-Noise Ratio (SINR), and tolerable multipath delay spread.

The cognitive engine module 210 further determine a common frequency set for the group of radio devices by comparing the identified usable frequencies for the group of radio devices. The spectral sensing module 205 and the cognitive engine module 210 may compute an intersection of the sets of usable frequencies identified for the group of radio devices to determine the common frequency set. Thereafter, the spectral sensing module 205 and the cognitive engine module 210 determine an active frequency set for each radio device from the common frequency set. The active frequency set of a radio device is determined based on its hardware capability. The number of frequencies in the active frequency set depends on the hardware capability of the radio device 110. For example, if the radio device 110 is capable of accommodating two frequencies, then the active frequency set selected for the radio device 110 includes two frequencies. Similarly, if the radio device 120 is capable of accommodating three frequencies, then an active frequency set selected for the radio device 120 includes three frequencies.

The active frequency set includes the lowest frequency in the common frequency set. The active frequency set may be selected such that spacing between frequencies in the active frequency set is maximized. Maximum spacing between the frequencies improves the likelihood of realizing frequency diversity gain. Alternatively, the active frequency set may be selected such that the spacing between subsequent frequencies in the active frequency set exceeds the coherence bandwidth. The coherence bandwidth is a frequency interval over which two frequencies of a signal are likely to experience correlated amplitude fading. If a signal is transmitted over two frequencies, which are separated by at least the coherence bandwidth, then the signals at each of the two frequencies experience independent fading. Therefore, the active frequency may be selected such that the spacing between subsequent frequencies in the active frequency set of each radio device exceeds the coherence bandwidth to achieve independent fading.

Thereafter, the spectral sensing module 205 and the cognitive engine module 210 select a lowest cardinality frequency set from the active frequency sets of the group of radio devices. The lowest cardinality frequency set is an active frequency set that includes the least number of frequencies. For example, the active frequency set for the radio device 110 includes two frequencies and the active frequency set for the radio device 120 includes three frequencies. Therefore, the lowest cardinality frequency set for the radio device 110 and the radio device 120 is the active frequency set of the radio device 110. Thereafter, the radio device 110 and the radio device 120 simultaneously communicate over the two frequencies in the lowest cardinality frequency set. This enables the radio device 110 and the radio device 120 to achieve frequency diversity.

In an embodiment of the invention, the spectral sensing module 205 of the radio device 110 senses frequency spectrum and identifies a set of usable frequencies from the sensed frequency spectrum based on the predetermined criteria. Thereafter, the spectral sensing module 205 reports the set of usable frequencies to the cognitive engine module 210 of the radio device 110. Additionally, the cognitive engine module 210 of the radio device 110 receives a set of usable frequencies from each radio device, other than the radio device 110, in the group of radio devices. Thereafter, the cognitive engine module 210 performs an intersection of the sets of usable frequencies identified for the group of radio device to determine a common frequency set for the group of radio devices.

Thereafter, the cognitive engine module 210 selects an active frequency set for the radio device 110 based on the common frequency set. Finally, the cognitive engine module 210 selects a lowest cardinality frequency set for the group of radio devices from the active frequency set selected for each radio device in the group of radio devices.

In another embodiment of the invention, the spectral sensing module 205 in radio device 110 senses frequency spectrum and reports metrics corresponding to the frequency spectrum to the cognitive engine module 210. The cognitive engine module 210 identifies a set of usable frequencies for the radio device 110 based on the predetermined criteria associated with the metrics. Thereafter, the cognitive engine module 210 performs an intersection of the sets of usable frequencies identified for the group of radio devices to determine the common frequency set and to determine the active frequency set and the lowest cardinality frequency set.

Figure 3:
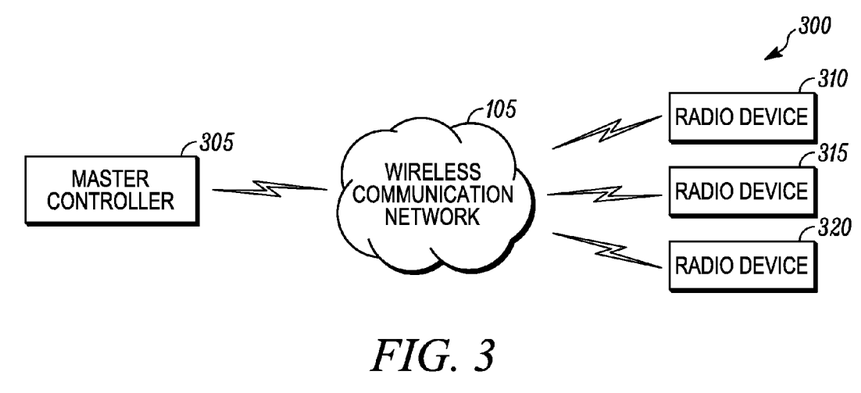
FIG. 3 is a block diagram showing a system for performing communication in a wireless communication network, in accordance with another embodiment of the invention.

FIG. 3 is a block diagram showing a system 300 for performing communication in the wireless communication network 105, in accordance with another embodiment of the invention. The system 300 includes a master controller 305 and a group of radio devices (for example, a radio device 310, a radio device 315, and a radio device 320), which communicate with one another through the wireless communication network 105. The master controller 305 may be a radio device, similar to radio devices in the group of radio devices, but with an additional capability to provide centralized control to the group of radio devices.

Each radio device in the group of radio devices includes a spectral sensing module. The spectral sensing module of each radio device determines one or more available frequency bands. A cognitive engine module identifies a set of usable frequencies from one or more available frequency bands based on predetermined criteria. This has been explained in conjunction with FIG. 2. The master controller 305 receives a set of usable frequencies identified for each radio device. The master controller 305 determines a common frequency set for the group of radio devices based on the set of usable frequencies identified for each radio device. The master controller 305 selects an active frequency set for each radio device based on the common frequency set. The active frequency set for a radio device depends on its hardware capability. The active frequency set may be selected based on the spacing between the subsequent frequencies in the active frequency set being maximum. Alternatively, the active frequency set may be selected based on the spacing between the subsequent frequencies in the active frequency set exceeding the coherence bandwidth. This has been explained in conjunction with FIG. 2.

Thereafter, the master controller 305 selects a lowest cardinality frequency set for the group of radio devices from the common frequency set. The lowest cardinality frequency set is an active frequency set that includes the least number of frequencies. This has been explained in conjunction with FIG. 2. In this embodiment, the determination of an active frequency set for each radio device and the lowest cardinality frequency set for the group of radio devices is determined in a centralized manner by the master controller 305.

Figure 4:
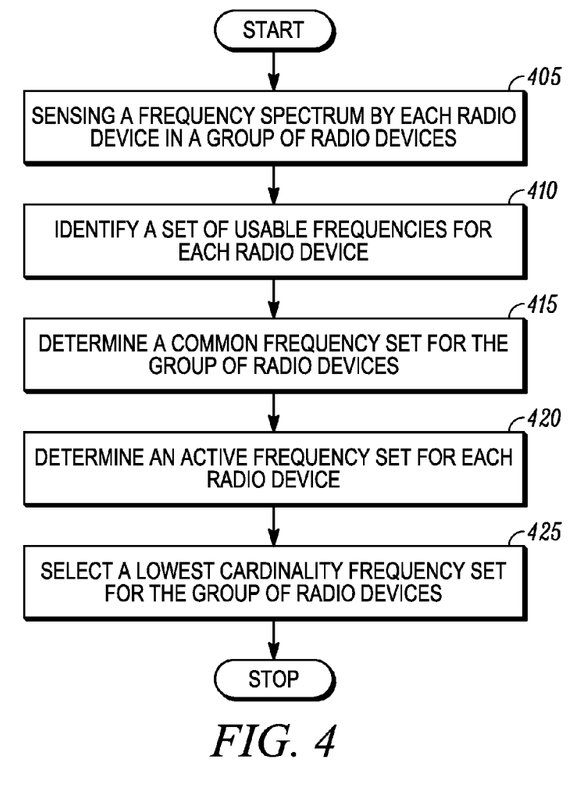
FIG. 4 is a flow diagram of a method for performing communication in a wireless communication network, in accordance with an embodiment of the invention.

FIG. 4 is a flow diagram of a method for performing communication in the wireless communication network 105, in accordance with an embodiment of the invention. The wireless communication network 105 may be a PSCN.

The spectral sensing module 205 of each radio device in the group of radio devices senses frequency spectrum at step 405. A cognitive engine module 210 identifies a set of usable frequencies from the sensed frequency spectrum for each radio device based on predetermined criteria, at step 410. In an embodiment of the invention, the spectral sensing module 205 identifies the set of usable frequencies from the frequency spectrum. Alternatively, the spectral sensing module 205 and the cognitive engine module 210 together identify the set of usable frequencies from the frequency spectrum. The set of usable frequencies includes frequencies selected from a primary frequency spectrum and a secondary frequency spectrum. The predetermined criteria for selecting a usable frequency may include, but are not limited to power level detected over a bandwidth being less than a predefined threshold, adequate Signal-to-Interference-plus-Noise Ratio (SINR), and tolerable multipath delay spread.

At step 415, the cognitive engine module 210 of each radio device determines a common frequency set from the sets of identified usable frequencies for the group of radio devices. The common frequency set may be determined by comparing the identified usable frequencies for each radio device. Alternatively, the common frequency set is determined by the computing an intersection of the sets of usable frequencies identified for the group of radio devices. In an embodiment of the invention, the master controller 305 may determine the common frequency set for the group of radio devices. Thereafter, the cognitive engine module 210 of each radio device selects an active frequency set for the corresponding radio device from the common frequency set based on the hardware capability of the corresponding radio device, at step 420. The active frequency set for each radio device includes the lowest frequency in the common frequency set. Further, the number of frequencies in an active frequency set for a radio device depends on the hardware capability of the radio device. An active frequency set may be selected such that spacing between frequencies in the active frequency set is maximum. Maximum spacing between the frequencies improves the likelihood of realizing frequency diversity gain. In another embodiment, the spacing between frequencies in an active frequency set exceeds the coherence bandwidth in order to achieve independent fading. This has been explained in conjunction with FIG. 2.

At step 425, the cognitive engine module 210 in each radio device selects a lowest cardinality frequency set for the group of radio devices from the active frequency sets selected for the group of radio devices for communication amongst the group of radio devices. In an embodiment of the invention, the master controller 305 may select the lowest cardinality frequency set. The lowest cardinality frequency set is an active frequency set that includes the least number of frequencies. Radio devices in the group of radio devices simultaneously perform communication over the frequencies in the lowest cardinality frequency set to achieve frequency diversity.

Figure 5:
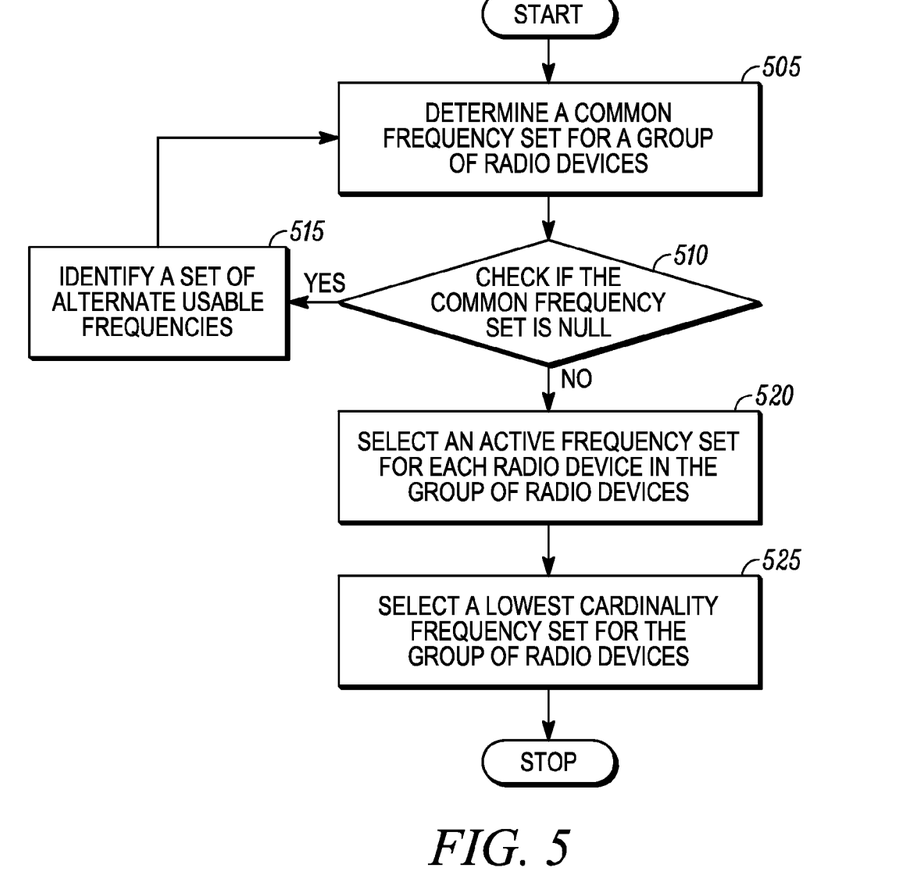
FIG. 5 is a flow diagram of a method for selecting a lowest cardinality frequency set for a group of radio devices in a wireless communication network, in accordance with another embodiment of the invention.

FIG. 5 is a flow diagram of a method for selecting a lowest cardinality frequency set for a group of radio devices in the wireless communication network 105, in accordance with an embodiment of the invention. At step 505, the cognitive engine module 210 of each radio device determines a common frequency set for the group of radio devices. In an embodiment of the invention, the master controller 305 may determine the common frequency set for the group of radio devices. The common frequency set is determined from the sets of identified usable frequencies. This has been explained in conjunction with FIG. 4. Thereafter, the cognitive engine module 210 performs a check to determine if the common frequency set is null at step 510. In an embodiment of the invention, the master controller 305 may perform the check to determine if the common frequency set is null.

If the common frequency set is null, the spectral sensing module 205 of each radio device identifies a set of alternate usable frequencies from the frequency spectrum at step 515. In another embodiment of the invention, the set of alternate usable frequencies is identified by the cognitive engine module 210. Thereafter, the step 505 is repeated to determine a common frequency set for the group of radio devices. The common frequency set is determined by comparing sets of alternate usable frequencies identified for the group of radio devices.

Referring back to step 510, if the common frequency set is not null, the cognitive engine module 210 in each radio device selects an active frequency set for the corresponding radio device from the common frequency set, at step 520. In another embodiment of the invention, the master controller 305 may select an active frequency set for each radio device from the common frequency set. This is further explained in detail in conjunction with FIG. 6. The active frequency set for each radio device includes the lowest frequency in the common frequency set. Further, the number of frequencies in an active frequency set for a radio device depends on the hardware capability of the radio device. An active frequency set may be selected such that spacing between frequencies in the active frequency set is maximized. Maximum spacing between the frequencies improves the likelihood of realizing frequency diversity gain. In another embodiment, the spacing between frequencies in an active frequency set exceeds the coherence bandwidth in order to achieve independent fading. This has been explained in conjunction with FIG. 2.

At step 525, the cognitive engine module 210 in each radio device selects a lowest cardinality frequency set for the group of radio devices from the common frequency set based on the active frequency sets selected for the group of radio devices. In an alternate embodiment of the invention, the master controller 305 may select the lowest cardinality frequency set for the group of radio devices. The lowest cardinality frequency set is an active frequency set that includes the least number of frequencies. Thereafter, radio devices in the group of radio devices simultaneously perform communication over the frequencies in the lowest cardinality frequency set to achieve frequency diversity.

Figure 6:
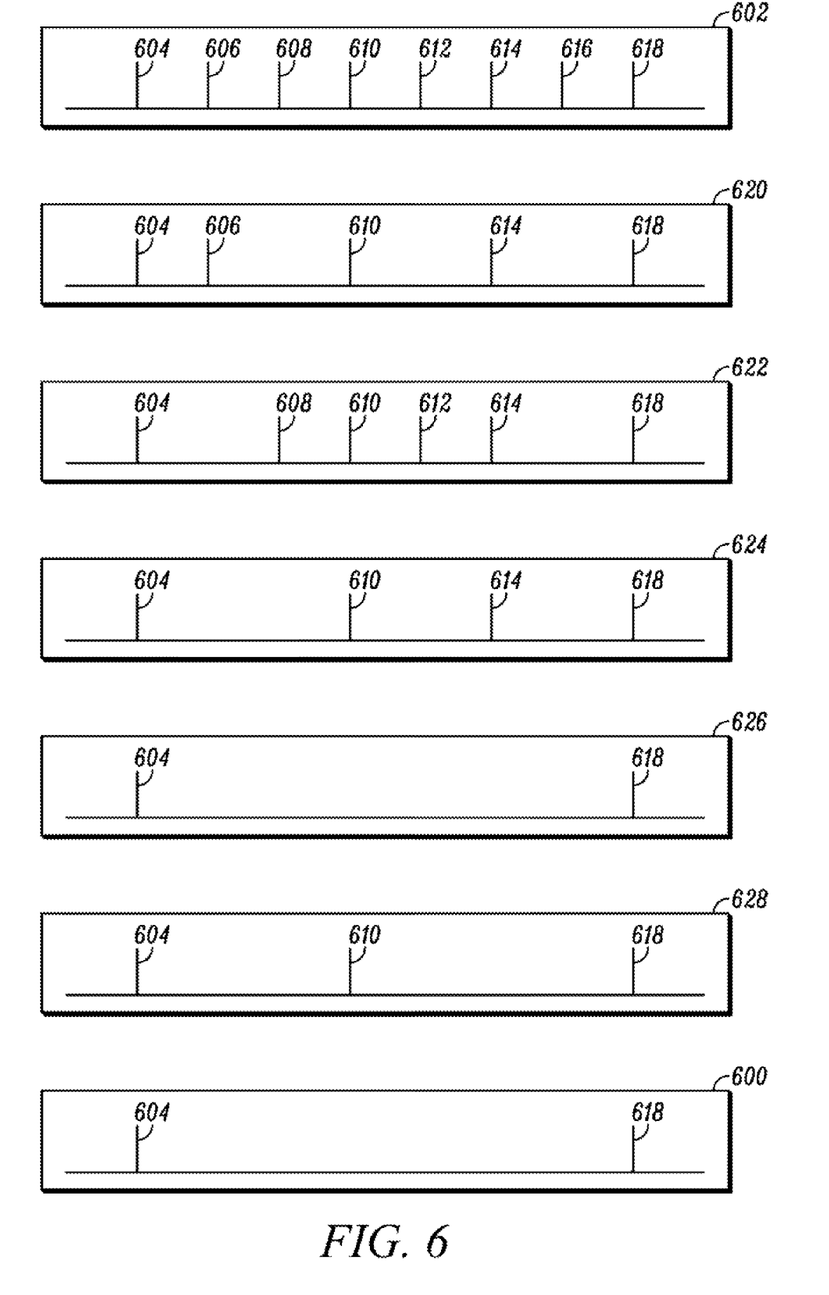
FIG. 6 shows the selection of a lowest cardinality frequency set in a wireless communication network, in accordance with an exemplary embodiment of the invention.

FIG. 6 shows the selection of a lowest cardinality frequency set 600 in the wireless communication network 105, in accordance with an exemplary embodiment of the invention. In the wireless communication network 105, a frequency spectrum 602 is determined. The frequency spectrum 602 includes a frequency 604, a frequency 606, a frequency 608, a frequency 610, a frequency 612, a frequency 614, a frequency 616, and a frequency 618. The spectral sensing module 205 of the radio device 110 identifies a set of usable frequencies 620 from the frequency spectrum 602 based on predetermined criteria. The set of usable frequencies 620 includes the frequency 604, the frequency 606, the frequency 610, the frequency 614, and the frequency 618.

Similarly, the spectral sensing module of the radio device 120 identifies a set of usable frequencies 622 from the frequency spectrum 602 based on the predetermined criteria. The set of usable frequencies 622 includes the frequency 604, the frequency 608, the frequency 610, the frequency 612, the frequency 614, and the frequency 618.

The radio device 110 and the radio device 120 communicate the information regarding the set of usable frequencies 620 and the set of usable frequencies 622 with each other. Thereafter, the cognitive engine module 210 of the radio device 110 and the cognitive engine module of the radio device 120 compute an intersection of the set of usable frequencies 620 and the set of usable frequencies 622 to determine a common frequency set 624 for the radio device 110 and the radio device 120. The common frequency set 624 includes the frequency 604, the frequency 610, the frequency 614 and the frequency 618, which are included in each of the set of usable frequencies 620 and the set of usable frequencies 622.

Thereafter, the cognitive engine module 210 of the radio device 110 selects an active frequency set 626 that includes two frequencies, i.e., the frequency 604 and the frequency 618 from the common frequency set 624. The active frequency set 626 includes two frequencies as the radio device 110 is capable of accommodating only two frequencies. Further, the active frequency set 626 includes the frequency 604 and the frequency 618, as the frequency 604 is the lowest frequency in the common frequency set 624 and the frequency 618 is at the maximum distance from the frequency 604. Information regarding the active frequency set 626 is communicated to the radio device 120.

Similarly, the radio device 120 is capable of accommodating three frequencies, therefore the cognitive engine module of the radio device 120 selects an active frequency set 628 that includes three frequencies, i.e., the frequency 604, the frequency 610, and the frequency 618 from the common frequency set 624. The active frequency set 628 includes the frequency 604, the frequency 610, and the frequency 618, as the frequency 604 is the lowest frequency in the common frequency set 624 and the consecutive spacing between the frequency 604, the frequency 610, and the frequency 618 is maximum. Information regarding the active frequency set 628 is then transmitted to the radio device 110 from the radio device 120.

Finally, the cognitive engine module 210 of the radio device 110 and the cognitive engine module of the radio device 120 select the lowest cardinality frequency set 600 from the active frequency set 626 and the active frequency set 628. The lowest cardinality frequency set 600 is the active frequency set 626, which includes the least number of frequencies, i.e., two. Thereafter, the radio device 110 and the radio device 120 perform communication over the frequency 604 and the frequency 618 to achieve frequency diversity.

Figure 7:
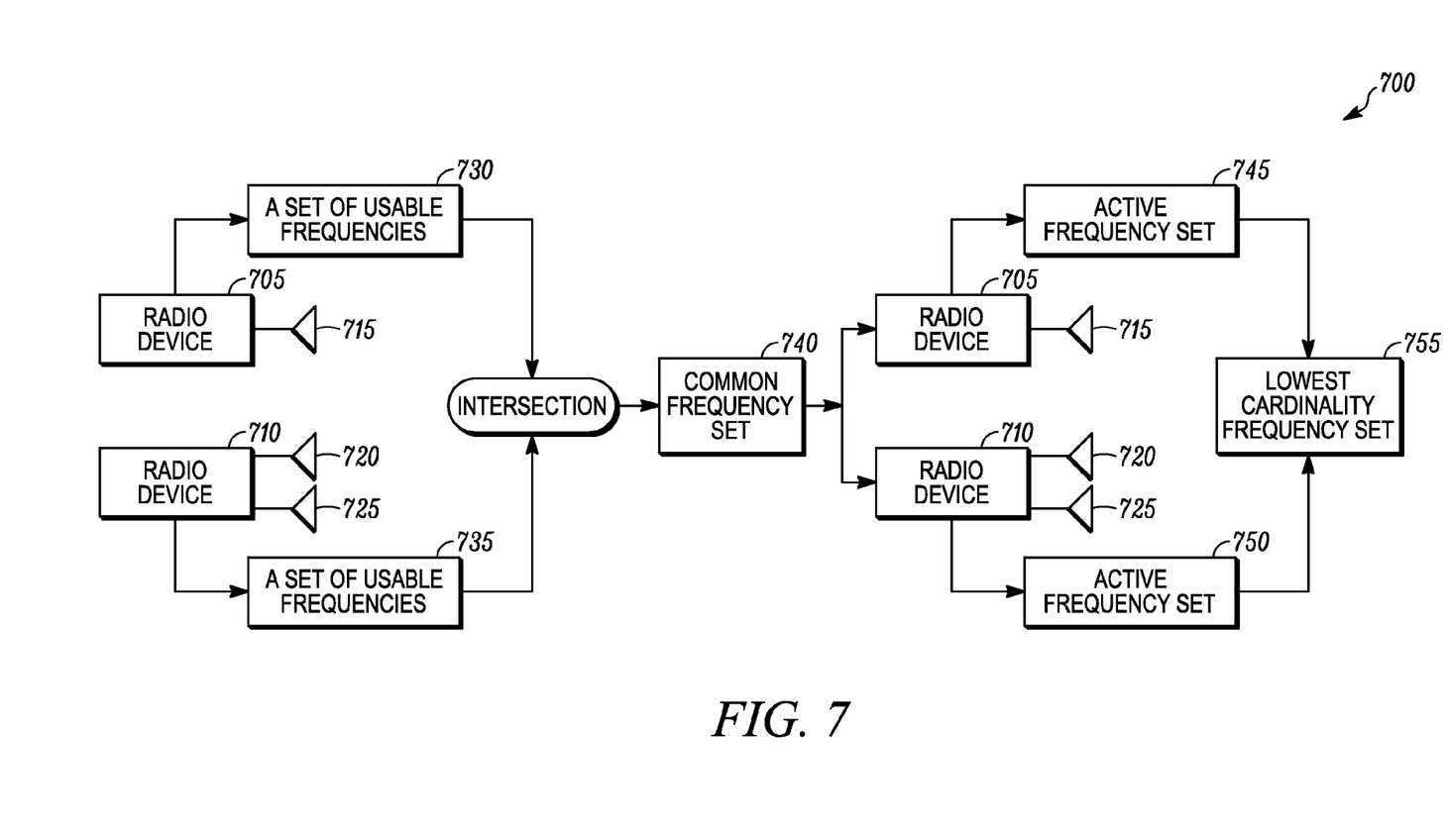
FIG. 7 shows a block diagram for the selection of a lowest cardinality frequency set in a wireless communication network, in accordance with an exemplary embodiment of the invention.

FIG. 7 shows a block diagram 700 summarizing the selection of a lowest cardinality frequency set in the wireless communication network 105, in accordance with an exemplary embodiment of the invention. The wireless communication network 105 includes a radio device 705 and a radio device 710. The radio device 705 includes a transceiver 715 and the radio device 710 includes two transceivers, i.e., a transceiver 720 and a transceiver 725. The radio device 705 identifies a set of usable frequencies 730 from the sensed frequency spectrum using the corresponding spectral sensing module and cognitive engine module based on predetermined criteria. Similarly, the radio device 710 identifies a set of usable frequencies 735 from the sensed frequency spectrum. Thereafter, the cognitive engine module of both radio device 705 and radio device 710 determines a common frequency set 740 by computing an intersection of the set usable frequencies 730 and the set of usable frequencies 735.

From the common frequency set 740, the cognitive engine module of the radio device 705 determines an active frequency set 745 based on its hardware capability. The active frequency set 745 includes a first number of frequencies. Similarly, the cognitive engine module of the radio device 710 also identifies an active frequency set 750 from the common frequency set 740 based on its hardware capability. The active frequency set 750 includes a second number of frequencies. In this example, as the radio device 705 has only one transceiver, i.e., transceiver 715 and the radio device 710 includes two transceivers, i.e., a transceiver 720 and a transceiver 725, the first number of frequencies in the active frequency set 745 is less than the second number of frequencies in the active frequency set 750.

Thereafter, the cognitive engine modules of the radio device 705 and the radio device 710 select a lowest cardinality frequency set 755. The lowest cardinality frequency set 755 is the active frequency set 745 that has lesser number of frequencies. Finally, the radio device 705 and radio device 710 start communications over the frequencies in the lowest cardinality frequency set 755.

Accordingly, there has been provided a wireless communication network 105 in which a plurality of radio devices achieves frequency diversity. By utilizing cognitive capability within the radio devices to iteratively select frequency sets, a lowest cardinality frequency set is generated and used to communicate amongst the plurality of radio devices. Each radio device can have different hardware, as the iterative selection of frequency set can take into account the different hardware capabilities of the radio devices.

Various embodiments of the invention provide methods and systems for performing communication in a wireless communication network. A lowest cardinality frequency set that includes a plurality of frequencies is identified for a group of radio devices. The plurality of frequencies is used by the radio devices in the group of radio devices simultaneously to achieve frequency diversity. The spacing between the frequencies in the lowest cardinality frequency set is maximized in order to improve the likelihood of realizing frequency diversity gain. Alternately, the spacing between the frequencies in the lowest cardinality frequency set exceeds the coherence bandwidth in order to realize independent fading for the signals transmitted over the frequencies and to enable continuous transmission.

In the foregoing specification, specific embodiments of the invention have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of communicating amongst a group of radio devices in a wireless communication network, the method comprising:
sensing frequency spectrum by each radio device within the group;
identifying a set of usable frequencies from the sensed frequency spectrums for each radio device based on predetermined criteria;
determining a common frequency set from the sets of identified usable frequencies;
determining, for each radio device, an active frequency set from the common frequency set based on hardware capability of each radio device;
selecting a lowest cardinality frequency set from the active frequency sets for communication amongst the group of radio devices, wherein the lowest cardinality frequency set includes frequencies that are common in the active frequency sets for each radio devices; and
using the frequencies in the lowest cardinality frequency set for simultaneous communication amongst the group of radio devices to achieve diversity gain.

2. The method of claim 1, wherein an active frequency set for a radio device comprises the lowest frequency from the common frequency set for the group of radio devices.

3. The method of claim 1, wherein spacing between frequencies in an active frequency set for a radio device is maximum.

4. The method of claim 1, wherein spacing between frequencies in an active frequency set for a radio device exceeds coherence bandwidth.

5. The method of claim 1, wherein the predetermined criteria for identifying a usable frequency is one or more of: a power level over a specific bandwidth at the frequency being less than a predefined threshold, adequate Signal-to-Interference-plus-Noise Ratio (SINR), and tolerable multipath delay spread.

6. The method of claim 1, wherein the set of usable frequencies is selected from both a primary frequency spectrum and a secondary frequency spectrum.

7. The method of claim 1, wherein determining the common frequency set comprises comparing the identified usable frequencies for each radio device.

8. The method of claim 1, wherein the common frequency set is determined by computing an intersection of the sets of usable frequencies identified for the group of radio devices.

9. The method of claim 1 further comprising identifying a set of alternate usable frequencies if the common frequency set is null, wherein each alternate usable frequency is different from each usable frequency in the set of usable frequencies.

10. A system for performing communication in a wireless communication network, the system comprising:
a group of radio devices, each radio device comprising:
a spectral sensing module;
a cognitive engine module operatively coupled with the spectral sensing module;
the spectral sensing module and cognitive engine module being used to identify a set of usable frequencies for each radio device, a common frequency set for the group of radio devices and, in conjunction with each radio device's hardware capability, an active frequency set for each radio device from which a lowest cardinality frequency set is selected to use for communication amongst the radio devices in the group of radio devices, wherein the lowest cardinality frequency set includes frequencies that are common in the active frequency sets for each radio devices; and
using the frequencies in the lowest cardinality frequency set for simultaneous communication amongst the group of radio devices to achieve diversity gain.

11. The system of claim 10, wherein the active frequency set comprises the lowest frequency in the common frequency set.

12. The system of claim 10, wherein the active frequency set is selected such that spacing between subsequent frequencies in the active frequency set is maximum.

13. The system of claim 10, wherein the active frequency set is selected such that spacing between frequencies exceeds coherence bandwidth.

14. The system of claim 10, wherein the cognitive engine module is configured to receive at least one usable frequency identified for each radio device from the cognitive engine module of each radio device.

15. The system of claim 10, wherein the common frequency set is determined by computing an intersection of the sets of usable frequencies identified for the group of radio devices.

16. The system of claim 10, wherein the spectral sensing module is used to identify the set of usable frequencies based on predetermined criteria and report the set of usable frequencies to the cognitive engine module, the cognitive engine module performing an intersection of the sets of usable frequencies from the group of radio devices to determine the common frequency set and to determine the active frequency set and the lowest cardinality frequency set.

17. The system of claim 10, wherein the spectral sensing module is used to report metrics to the cognitive engine module, and the cognitive engine module identifies the set of usable frequencies set for each radio device based on predetermined criteria associated with the metrics, the cognitive engine module performing an intersection of the sets of usable frequencies from the group of radio devices to determine the common frequency set and to determine the active frequency set and the lowest cardinality frequency set.

18. A system for performing communication in a wireless communication network, the system comprising:
    a group of radio devices, wherein each radio device comprises a spectral sensing module for determining at least one available frequency band; and
    a cognitive engine module for identifying a set of usable frequencies from the at least one available frequency band based on predetermined criteria; and
    a master controller configured to:
        determine a common frequency set for the group of radio devices based on the set of usable frequencies identified for each radio device;
        select an active frequency set for each radio device in the group from the common frequency set based on hardware capability of each radio device;
    select a lowest cardinality frequency set for the group of radio devices, wherein the lowest cardinality frequency set is an active frequency set comprising the least number of frequencies, wherein the lowest cardinality frequency set includes frequencies that are common in the active frequency sets for each radio devices; and
    using the frequencies in the lowest cardinality frequency set for simultaneous communication amongst the group of radio devices to achieve diversity gain.

19. The system of claim 18, wherein the active frequency set comprises the lowest frequency in the common frequency set.

20. The system of claim 18, wherein the active frequency set is selected based on at least one of the spacing between subsequent frequencies in the active frequency set being maximum and the spacing between subsequent frequencies in the active frequency set exceeding coherence bandwidth.

* * * * *